(12) United States Patent
Ho et al.

(10) Patent No.: US 10,962,168 B2
(45) Date of Patent: Mar. 30, 2021

(54) ELECTRONIC DEVICE WITH ELEVATING TYPE DISPLAY

(71) Applicants: Chun-Yi Ho, Taipei (TW); Huai-Te Tseng, Taipei (TW); Ming-Chung Peng, Taipei (TW); Chen-Yu Liao, Taipei (TW); Che-Wei Liang, Taipei (TW); Shih-Ching Hsu, Taipei (TW)

(72) Inventors: Chun-Yi Ho, Taipei (TW); Huai-Te Tseng, Taipei (TW); Ming-Chung Peng, Taipei (TW); Chen-Yu Liao, Taipei (TW); Che-Wei Liang, Taipei (TW); Shih-Ching Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 70 days.

(21) Appl. No.: 16/392,643

(22) Filed: Apr. 24, 2019

(65) Prior Publication Data
US 2020/0248862 A1 Aug. 6, 2020

(30) Foreign Application Priority Data
Feb. 1, 2019 (TW) ................................ 108104118

(51) Int. Cl.
*G06F 1/16* (2006.01)
*F16M 11/24* (2006.01)
*F16M 11/18* (2006.01)

(52) U.S. Cl.
CPC ............ *F16M 11/24* (2013.01); *F16M 11/18* (2013.01); *G06F 1/1607* (2013.01); *F16M 2200/08* (2013.01)

(58) Field of Classification Search
CPC ... H04M 2250/20; F16M 11/18; F16M 11/24; G06F 1/1607; G06F 1/1605
USPC .............................. 248/422, 639; 361/679.23
See application file for complete search history.

(56) References Cited

U.S. PATENT DOCUMENTS

| | | | | |
|---|---|---|---|---|
| 7,439,956 B1 * | 10/2008 | Albouyeh | ............. | G06F 1/1601 345/168 |
| 7,866,857 B2 * | 1/2011 | Jin | ...................... | F21V 33/0052 362/372 |
| 7,903,100 B2 * | 3/2011 | Kondo | .................... | A63F 13/02 345/204 |
| 8,276,857 B2 * | 10/2012 | Cvek | ...................... | F16M 11/18 248/132 |
| 8,631,747 B2 * | 1/2014 | Woo | ........................ | F16M 11/42 108/147 |
| 9,167,192 B2 * | 10/2015 | Eoh | ........................... | H04N 5/46 |
| 9,279,537 B2 * | 3/2016 | Hung | .................... | F16M 11/18 |
| 9,344,667 B2 * | 5/2016 | Sculler | ..................... | H04N 5/64 |
| 9,720,549 B2 * | 8/2017 | Hou | ....................... | G06F 3/0421 |

(Continued)

*Primary Examiner* — Bradley Duckworth
(74) *Attorney, Agent, or Firm* — JCIPRNET

(57) ABSTRACT

An electronic device including a base, a display and a functional assembly is provided. The display is movably connected to the base and adapted to act between a lower position and an upper position relative to the base. The functional assembly is movably connected to the base and adapted to act between a first state and a second state relative to the base. When the display acts to the upper position from the lower position, the functional assembly acts to the second state from the first state, and when the functional assembly acts to the first state from the second state, the display acts to the lower position from the upper position.

17 Claims, 13 Drawing Sheets

(56) References Cited

U.S. PATENT DOCUMENTS

| | | | |
|---|---|---|---|
| 9,958,108 B2* | 5/2018 | Bowman | F16M 11/24 |
| 9,976,699 B2* | 5/2018 | Hung | F16M 11/24 |
| 9,980,561 B1* | 5/2018 | Constantino | F16M 13/00 |
| 10,010,169 B2* | 7/2018 | Grotenhuis | A47B 21/02 |
| 10,321,233 B2* | 6/2019 | Lan | H04R 3/14 |
| 10,405,647 B2* | 9/2019 | Laudadio | A47B 21/04 |
| 10,686,971 B1* | 6/2020 | Yoo | H04N 5/2253 |
| 2009/0230263 A1* | 9/2009 | Burge | G06F 1/1605 248/220.1 |
| 2019/0385401 A1* | 12/2019 | Winston | G06F 1/1624 |
| 2020/0007999 A1* | 1/2020 | Lin | H04R 1/025 |
| 2020/0208772 A1* | 7/2020 | Woo | G06F 1/1601 |

\* cited by examiner

ELECTRONIC DEVICE WITH ELEVATING TYPE DISPLAY

CROSS-REFERENCE TO RELATED APPLICATION

This application claims the priority benefit of Taiwan application serial no. 108104118, filed on Feb. 1, 2019. The entirety of the above-mentioned patent application is hereby incorporated by reference herein and made a part of this specification.

BACKGROUND

Technical Field

The disclosure relates to an electronic device, and in particular to an electronic device with elevating type display.

Description of Related Art

With the advent of the information era, the popularity of computer products is also increasing year by year. Generally, desktop computers emphasize efficiency, and are not moved often; therefore, desktop computers usually have bigger sizes and heavier weights, accounting much working space of tables. In addition, desktop computers need to be connected to electronic devices through additional connecting wires, making the disposed location of the electronic devices limited to the length of the connecting wires. Thanks to the progress of technology and the rising concept of integration, electronic products are designed to be lighter and thinner; along with the development of light and thin trend, lighter and thinner electronic devices such as notebook computers, tablet PCs and all-in-one PCs (AIO PC) are increasing popular in the market of electronic products.

In some electronic devices, speakers are designed to be concealed by displays, and may be exposed to perform the output of audio according to the requirements. However, in general, the displays and speakers cannot operate in sequence automatically; and therefore cannot allow the user to have a good operating experience.

SUMMARY

The disclosure provides an electronic device, allowing the user to have a good operating experience.

The electronic device of the disclosure includes a base, a display and a functional assembly. The display is movably connected to the base and adapted to act between a lower position and an upper position relative to the base. The functional assembly is movably connected to the base and adapted to act between a first state and a second state relative to the base. When the display acts to the upper position from the lower position, the functional assembly acts to the second state from the first state, and when the functional assembly acts to the first state from the second state, the display acts to the lower position from the upper position.

In an embodiment of the disclosure, when the display is located at the lower position, the display conceals the functional assembly, and when the display is located at the upper position, the display exposes the functional assembly.

In an embodiment of the disclosure, the abovementioned electronic device includes a first driving assembly, wherein the first driving assembly is connected between the base and the display, and adapted to drive the display to act between the lower position and the upper position.

In an embodiment of the disclosure, the abovementioned first driving assembly includes a motor, a gear and a rack. The motor is disposed on the base. The gear is connected to the motor. The rack is disposed on the display and engages the gear, wherein the motor drives the gear to rotate along the rack, so as to drive the display to elevate.

In an embodiment of the disclosure, the abovementioned electronic device includes a second driving assembly, wherein the second driving assembly is connected between the base and the functional assembly, and adapted to drive the functional assembly to act between the first state and the second state.

In an embodiment of the disclosure, the abovementioned second driving assembly includes a motor, a gear and at least another gear. The motor is disposed on the base. The gear is connected to the motor. The another gear is disposed on the functional assembly and engages the gear, wherein the motor drives the gear to rotate, and the gear drives the another gear such that the functional assembly rotate.

In an embodiment of the disclosure, the abovementioned second driving assembly is adapted to drive the functional assembly to rotate.

In an embodiment of the disclosure, the abovementioned second driving assembly is adapted to drive the functional assembly to move horizontally.

In an embodiment of the disclosure, the abovementioned display has a display surface, and the functional assembly has a functional interface. When the functional assembly is in the first state, the functional interface and the display surface respectively face the opposite directions, and when the functional assembly is in the second state, the functional interface and the display surface face the same direction.

In an embodiment of the disclosure, the abovementioned functional assembly has a functional interface; when the functional assembly is in the first state, the functional interface is not located on the moving path of the display, and when the functional assembly is in the second state, the functional interface is located on the moving path of the display.

In an embodiment of the disclosure, the abovementioned base has a first switch and a second switch. The display has a first triggering portion. When the display acts to the upper position from the lower position, the first triggering portion triggers the first switch such that the display stop acting and the functional assembly act to the second state from the first state. When the display acts to the lower position from the upper position, the first triggering portion triggers the second switch such that the display stop acting.

In an embodiment of the disclosure, the abovementioned base has a third switch and a fourth switch. The functional assembly has a second triggering portion. When the functional assembly acts to the second state from the first state, the second triggering portion triggers the third switch such that the functional assembly stop acting. When the functional assembly acts to the first state from the second state, the second triggering portion triggers the fourth switch such that the functional assembly stop acting and the display act to the lower position from the upper position.

In an embodiment of the disclosure, the abovementioned base includes a host and a supporting base. The host is disposed on the supporting base, the display is movably connected to the host, and the functional assembly is movably connected to the supporting base.

In an embodiment of the disclosure, the abovementioned functional assembly includes at least one speaker.

Based on the above, in the electronic apparatus of the disclosure, when the display acts to the upper position, the functional assembly may correspondingly act to the second state from the first state. In addition, when the functional assembly restores to the first state, the display may correspondingly recover to the lower position. In other words, the display and the functional assembly may act in sequence automatically to allow the user to have a good operating experience.

In order to make the features and advantages of the disclosure mentioned above more understandable, embodiments will be described in detail below with reference to the accompanying drawings.

DESCRIPTION OF THE EMBODIMENTS

Figure 1:
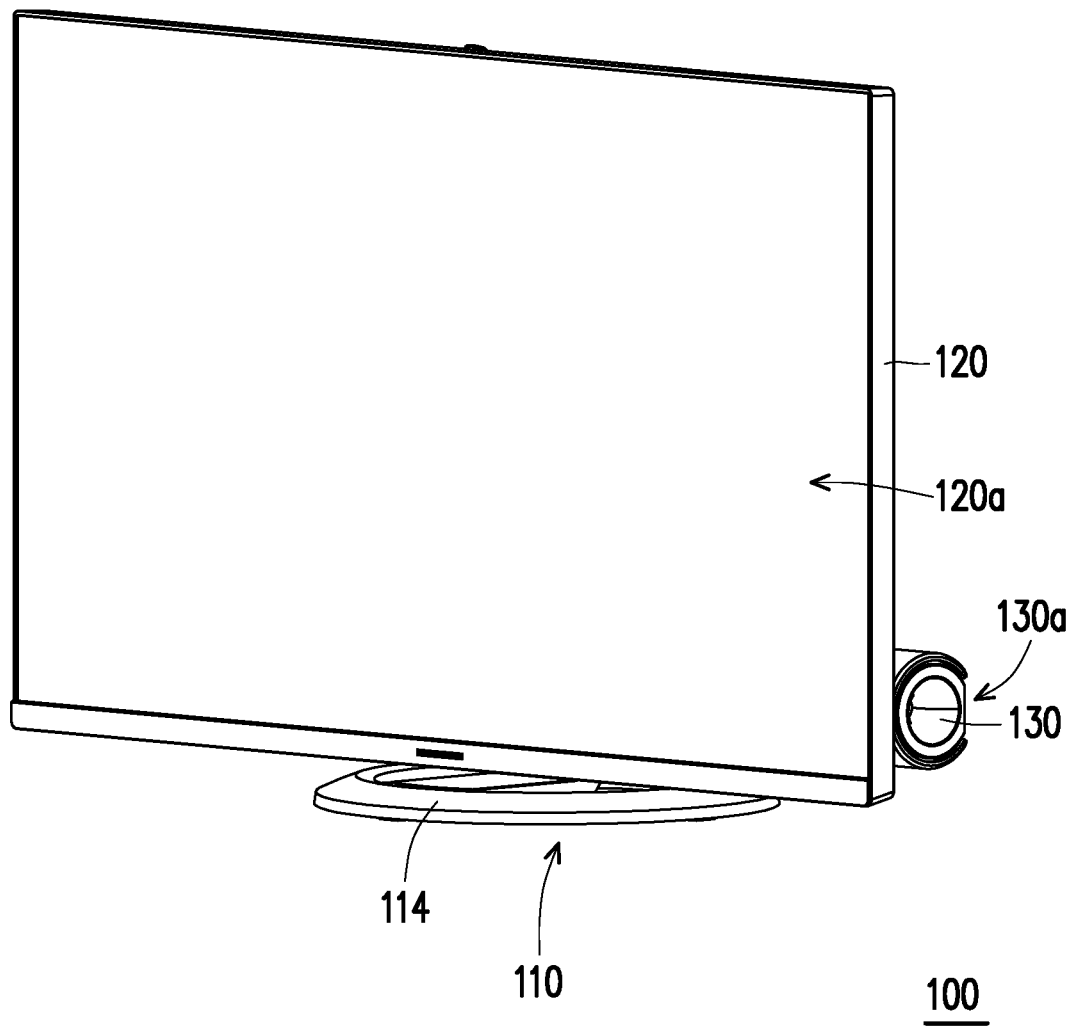
FIG. 1 is a stereogram of an electronic device according to an embodiment of the disclosure.
Figure 2:
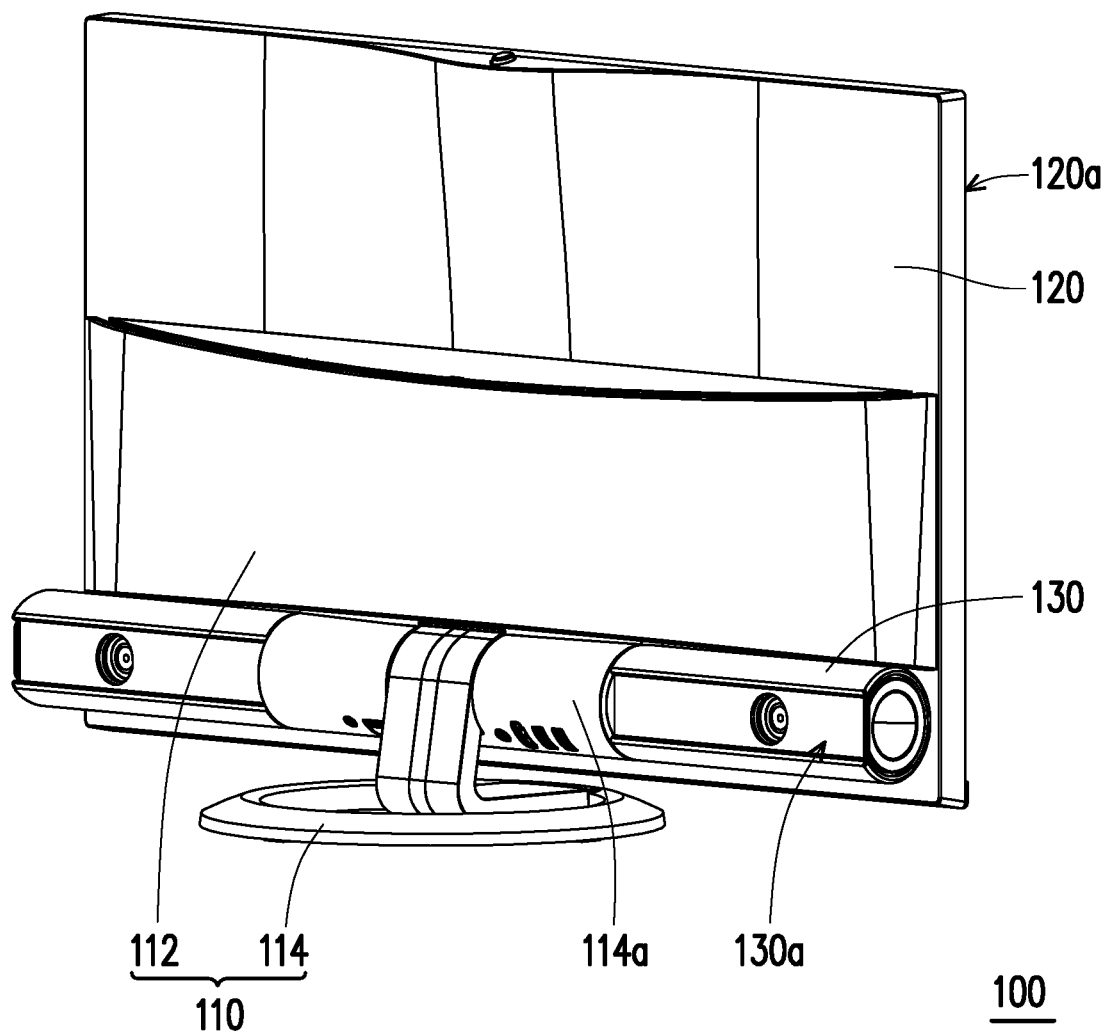
FIG. 2 is a stereogram of another viewing angle to the electronic device of FIG. 1.

FIG. 1 is a stereogram of an electronic device according to an embodiment of the disclosure. FIG. 2 is a stereogram of another viewing angle to the electronic device of FIG. 1. Please refer to FIG. 1 and FIG. 2. The electronic device 100 of the present embodiment is, for example, an all-in-one PC (AIO PC), and includes a base 110, a display 120 and a functional assembly 130. The base 110 includes a host 112 and a supporting base 114. The host 112 is disposed on the supporting base 114. The display 120 is, for example, a liquid crystal display, and may be movably connected to the host 112 of the base 110, which has a display surface 120a used to display pictures. The functional assembly 130 is, for example, a speaker, a camera lens, an infrared lens, a microphone, an auxiliary display, a storage box, and so on, and may be movably connected to a connecting portion 114a of the supporting base 114, which has a functional interface 130a (which is an audio-output side of the speaker) used to output audio.

Figure 3:
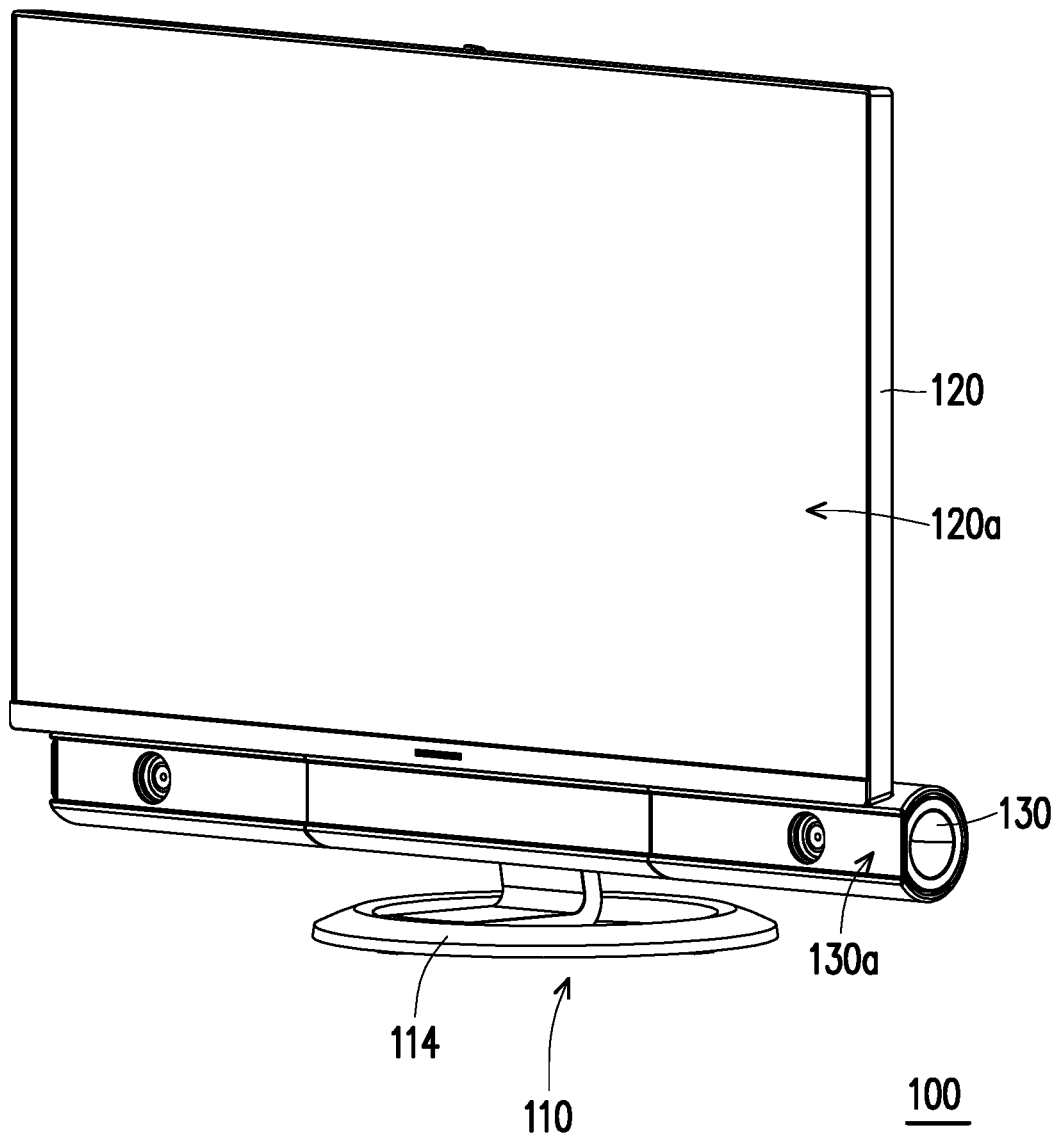
FIG. 3 shows the action of the display and the functional assembly of FIG. 1.
Figure 4:
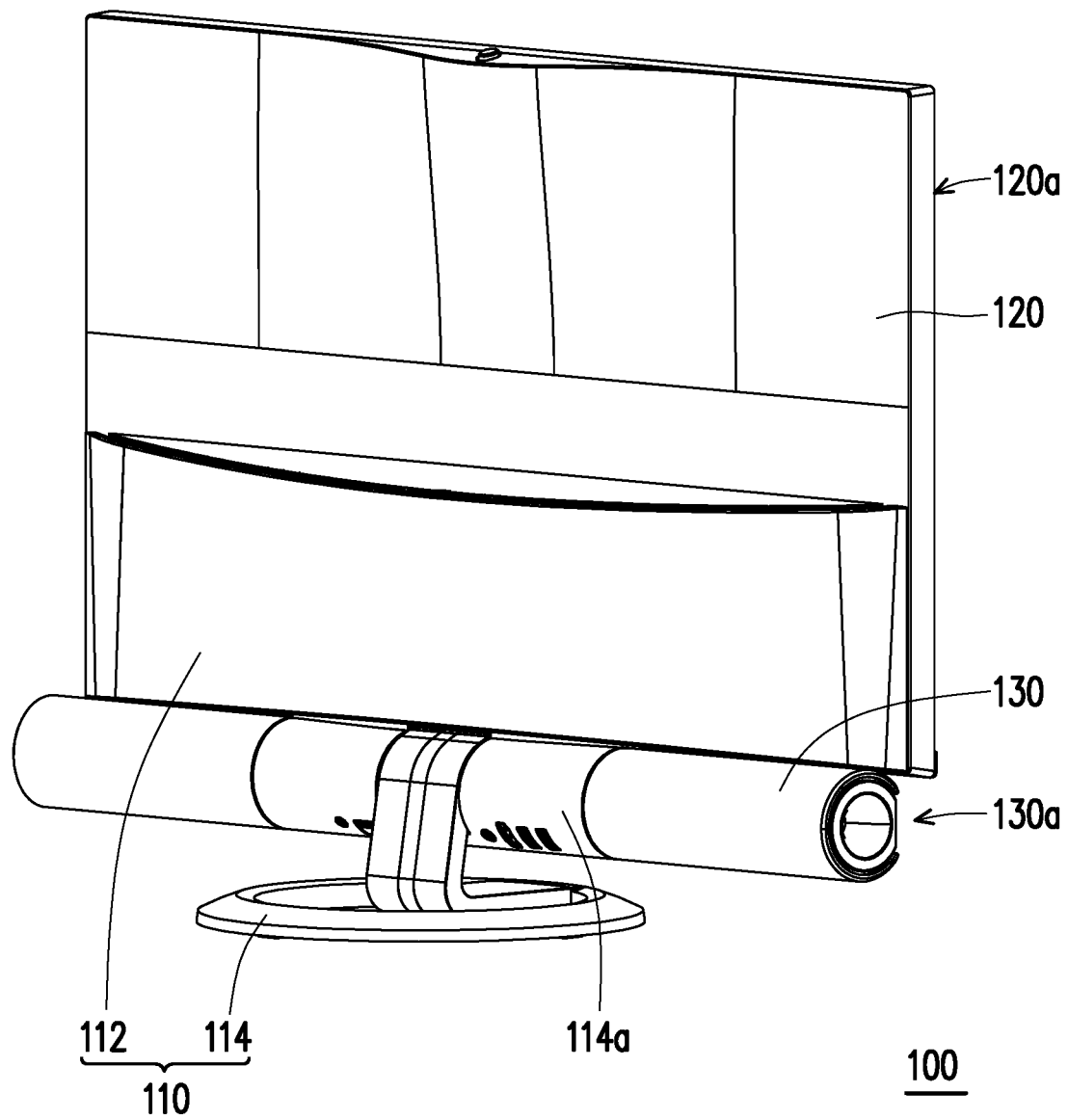
FIG. 4 is a stereogram of another viewing angle to the electronic device of FIG. 3.

FIG. 3 shows the action of the display and the functional assembly of FIG. 1. FIG. 4 is a stereogram of another viewing angle to the electronic device of FIG. 3. The display 120 is adapted to act between the lower position as shown in FIG. 1 and FIG. 2 and the upper position as shown in FIG. 3 and FIG. 4 relative to the base 110, and the functional assembly 130 is adapted to act between the first state as shown in FIG. 1 and FIG. 2 and the second state as shown in FIG. 3 and FIG. 4 relative to the base 110.

Specifically, when the display 120 is located at the lower position and the functional assembly 130 is in the first state, the display 120 conceals the functional assembly 130 as shown in FIG. 1 and FIG. 2 and the functional interface 130a of the functional assembly 130 as well as the display surface 120a of the display 120 respectively face the opposite directions as shown in FIG. 1 and FIG. 2. Thus, the functional assembly 130 is hidden in the back of the display 120, so as to make the display side of the electronic device clear.

On another front, when the display 120 is located at the upper position and the functional assembly 130 is in the second state, the display 120 exposes the functional assembly 130 as shown in FIG. 3 and FIG. 4 and the functional interface 130a of the functional assembly 130 as well as the display surface 120a of the display 120 face the same direction. Thus, the functional assembly 130 may output audio to the user.

In the present embodiment, when the display 120 acts to the upper position as shown in FIG. 3 and FIG. 4 from the lower position as shown in FIG. 1 and FIG. 2 through the operation of the user (for example, through physical keys, touch control, voice control, remote device control and so on), the functional assembly 130 correspondingly acts to the second state as shown in FIG. 3 and FIG. 4 from the first state as shown in FIG. 1 and FIG. 2. Similarly, when the functional assembly 130 acts to the first state as shown in FIG. 1 and FIG. 2 from the second state as shown in FIG. 3 and FIG. 4 through the operation of the user (for example, through physical keys, touch control, voice control, remote device control and so on), the display 120 correspondingly acts to the lower position as shown in FIG. 1 and FIG. 2 from the upper position as shown in FIG. 3 and FIG. 4. In other words, the display 120 and the functional assembly 130 may act in sequence automatically to allow the user to have a good operating experience.

In addition, the action of the display 120 and the functional assembly 130 may be decided by different second states of the functional assembly 130. For example, under the situation that the functional assembly 130 is a speaker, the functional assembly 130 plays the audio information according to a received audio format of an audio information. If the electronic device 100 determines that the audio format is a stereophonic format or a multiphonic format, it represents that the functional assembly 130 is in an a stereophonic output mode or in a multiphonic output mode, thus making the display 120 maintain or act to the upper position and making the functional assembly 130 maintain or act to the second state to perform the audio output efficiency of the functional assembly 130. On the contrary, if the electronic device 100 determines that the audio format is a monophonic format, it represents that the functional assembly 130 is in a monophonic output mode, thus making the display 120 maintain or act to the lower position and making the functional assembly 130 maintain or act to the first state. In addition, if the electronic device 100 determines that the audio format is a stereophonic format or a multiphonic format, the speaker may thus be controlled to generate at least one virtual audio source in the space to further improve the sound effect of the speaker.

Figure 5:
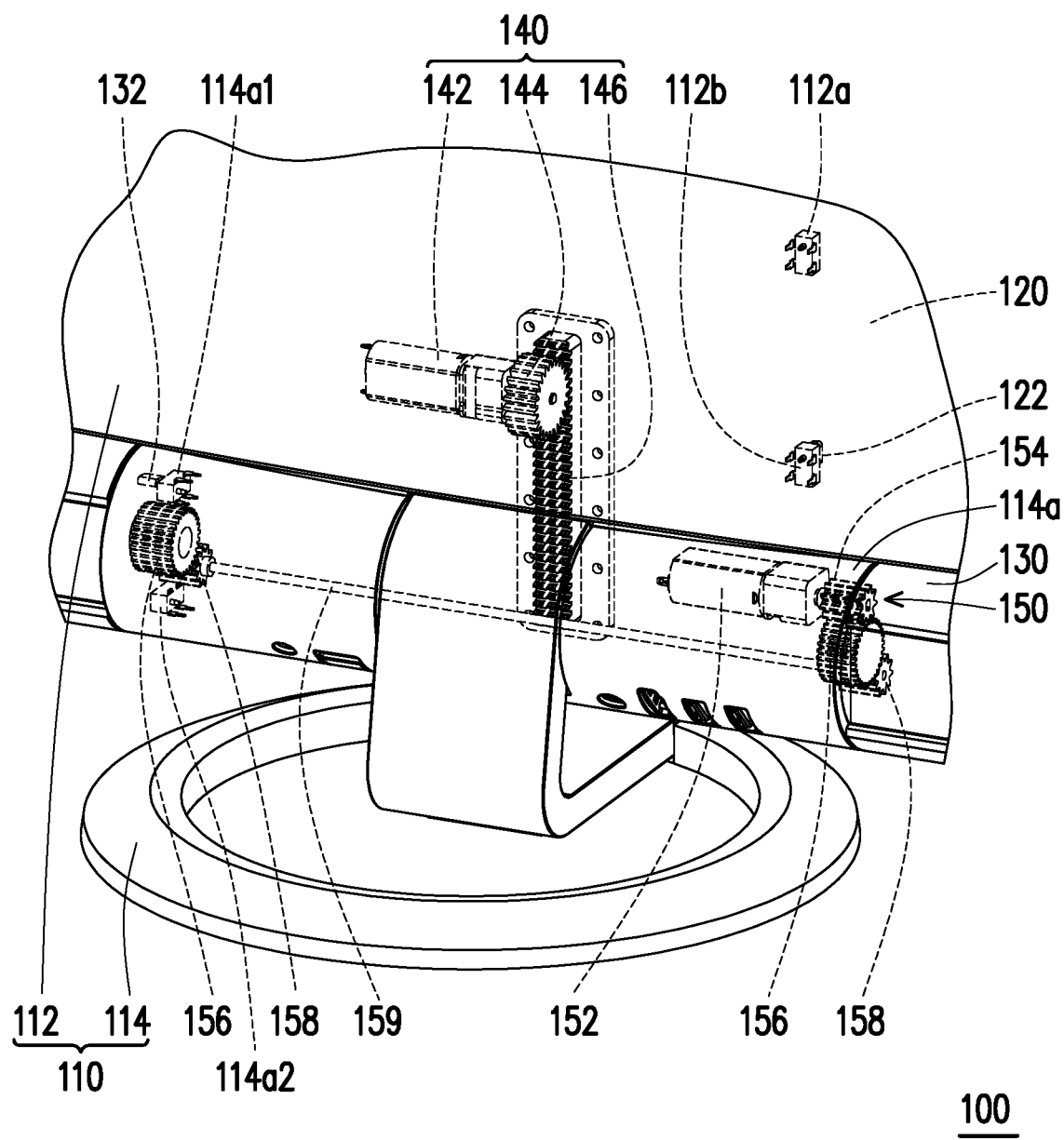
FIG. 5 is a partial stereogram of the electronic device of FIG. 1.

The specific way of driving the display 120 and the functional assemble 130 is to be further explained through FIG. 5. FIG. 5 is a partial stereogram of the electronic device of FIG. 1. Please refer to FIG. 5. The electronic device 100 of the present embodiment includes a first driving assembly 140 connected between the base 110 and the display 120, and used to drive the display 120 to act between the lower position as shown in FIG. 1 and FIG. 2 and the upper position as shown in FIG. 3 and FIG. 4. Specifically, the first driving assembly 140 includes a motor 142, a gear 144 and a rack 146. The motor 142 is disposed on the host 112 of the base 110, and the gear 144 is connected to the motor 142 to be adapted to be driven by the motor 142 to rotate. The rack 146 is disposed on the display 120 and engages the gear 144 to elevate through the rotation of the gear 144, further driving the display 120 to elevate between the lower position as shown in FIG. 1 and FIG. 2 and the upper position as shown in FIG. 3 and FIG. 4. In other embodiments, the action of the display 120 may be driven by driving assemblies in other forms, and is not limited by the disclosure.

In addition, the electronic device 100 of the present embodiment includes a second driving assembly 150 connected between the base 110 and the functional assembly 130, and adapted to drive the functional assembly 130 to act between the first state as shown in FIG. 1 and FIG. 2 and the second state as shown in FIG. 3 and FIG. 4. Specifically, the second driving assembly 150 includes the motor 152, and gear 154 and the rack 156 (shown as two gears 156 connected to each other through the gear 158 and the lever 159). The motor 152 is disposed on the connecting portion 114a of the supporting base 114 of the base 110, and the gear 154 is connected to the motor 152 to be adapted to be driven by the motor 142 to rotate. The gear 156 is connected to the functional assembly 130 and engages the gear 154 to rotate through the rotation of the gear 154, so as to drive the functional assembly 130 to rotate between the first state as shown in FIG. 1 and FIG. 2 and the second state as shown in FIG. 3 and FIG. 4. In other embodiments, the action of the functional assembly 130 may be driven by driving assemblies in other forms, and is not limited by the disclosure.

Figure 6:
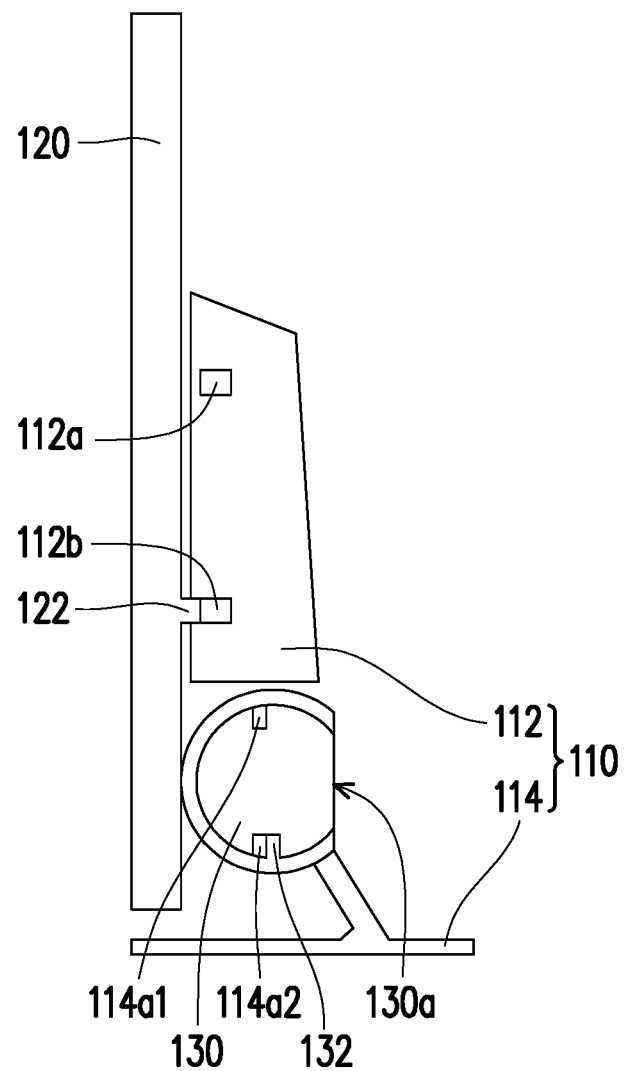
FIG. 6 and FIG. 7 are schematic views of the action of the display and the functional assembly of FIG. 1.
Figure 7:
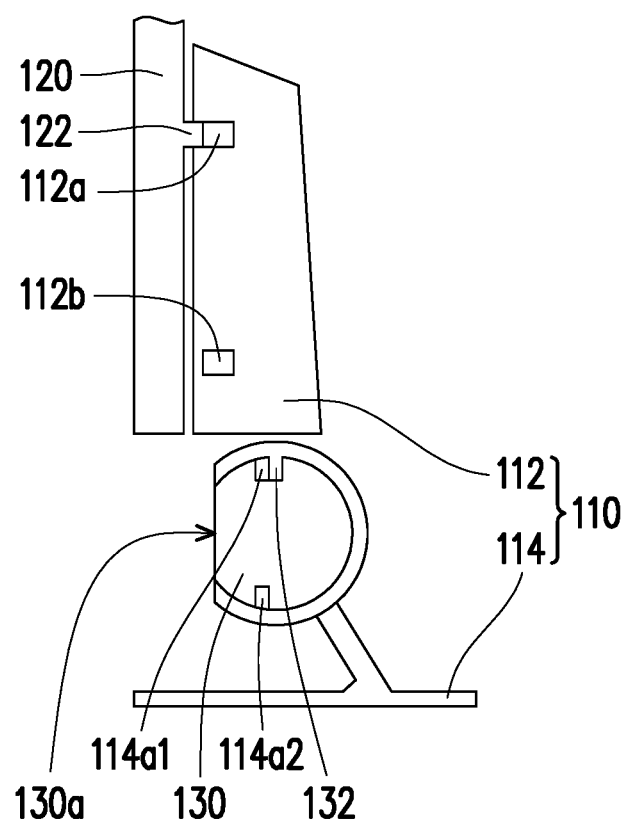

The specific way of making the display 120 and the functional assembly 130 act in sequence automatically is to be further explained through FIG. 6 and FIG. 7. FIG. 6 and FIG. 7 are schematic views of the action of the display and the functional assembly of FIG. 1. Please refer to FIG. 5 to FIG. 7. The host 112 of the base 110 of the present embodiment has a first switch 112a and a second switch 112b, the display 120 has a first triggering portion 122, the connecting portion 114a of the supporting base 114 of the base 110 has a third switch 114a1 and a fourth switch 114a2, and the functional assembly 130 has a second triggering portion 132. When the display 120 acts to the upper position as shown in FIG. 7 from the lower position as shown in FIG. 6, the first triggering portion 122 triggers the first switch 112a such that the display 120 stop acting and the functional assembly 130 act to the second state as shown in FIG. 7 from the first state as shown in FIG. 6. At the same time, the second triggering portion 132 triggers the third switch 114a1 such that the functional assembly 130 stop acting. In addition, when the functional assembly 130 acts to the first state as shown in FIG. 6 from the second state as shown in FIG. 7, the second triggering portion 132 triggers the fourth switch 114a2 such that the functional assembly 130 stop acting and the display 120 act to the lower position as shown in FIG. 6 from the upper position as shown in FIG. 7. At the same time, the first triggering portion 122 triggers the second switch 112b such that the display 120 stop acting.

Figure 8:
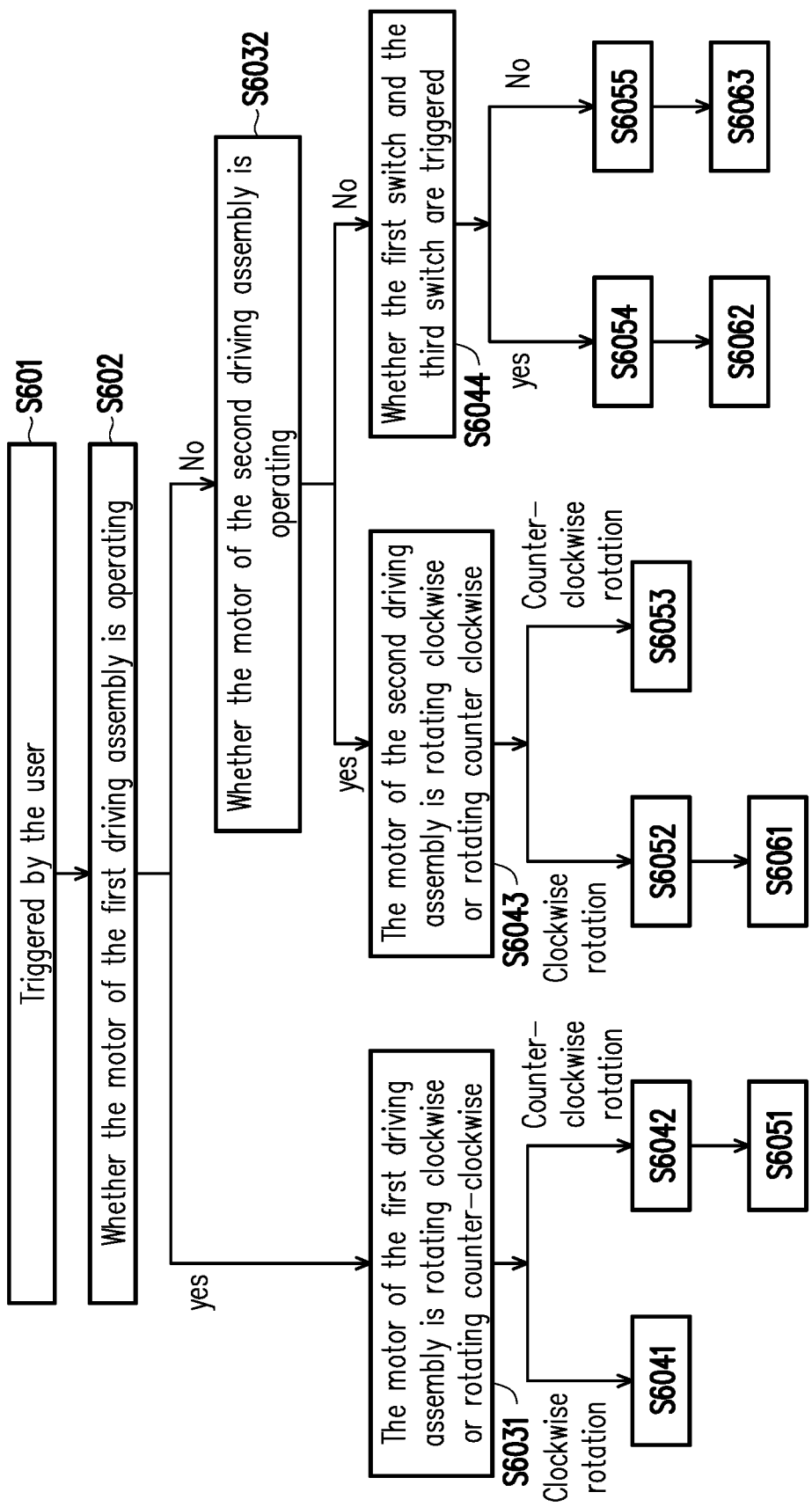
FIG. 8 shows the action rules of the first driving assembly and the second driving assembly of FIG. 5.

The action rules of the first driving assembly 140 and the second driving assembly 150 with the first switch 112a, the second switch 112b, the first triggering portion 122, the third switch 114a1, the fourth switch 114a2, and the second triggering portion 132 is to be further explained in details through FIG. 8. FIG. 8 shows the action rules of the first driving assembly and the second driving assembly of FIG. 5. Please refer to FIG. 8. Firstly, the electronic device 100 (step S601) is triggered by the operation of the user (for example, through physical keys, touch control, voice control, remote device control and so on). Further, the electronic device 100 determines whether the motor 142 of the first driving assembly 140 is operating (step S602). If the determination of the step S602 is yes, the motor 142 of the first driving assembly 140 is further determined as rotating clockwise or rotating counter clockwise (step S6031). If the determination of the step S6031 is clockwise rotation, the motor 142 of the first driving assembly 140 is changed to rotate counter-clockwise until the second switch 112b is triggered, making the motor 142 of the first driving assembly 140 stop operating (step S6041). If the determination of the step S6031 is counter-clockwise rotation, the motor 142 of the first driving assembly 140 is changed to rotate clockwise until the first switch 112a is triggered, making the motor 142 of the first driving assembly 140 stop operating (step S6042). After the step S6042, the motor 152 of the second driving assembly 150 is made to rotate clockwise until the third switch 114a1 is triggered, making the motor 152 of the second driving assembly 150 stop operating (step S6051).

If the determination of the step S602 is no, whether the motor 152 of the second driving assembly 150 is operating is further determined (step S6032). If the determination of the step S6032 is yes, the motor 152 of the second driving assembly 150 is further determined as rotating clockwise or rotating counter-clockwise (step S6043). If the determination of the step S6043 is clockwise rotation, the motor 152 of the second driving assembly 150 is changed to rotate counter-clockwise until the fourth switch 114a2 is triggered, making the motor 152 of the second driving assembly 150 stop operating (step S6052). After the step S6052, the motor 142 of the first driving assembly 140 is made to rotate counter-clockwise until the second switch 112b is triggered, making the motor 142 of the first driving assembly 140 stop operating (step S6061). If the determination of the step S6043 is counter-clockwise rotation, the motor 152 of the second driving assembly 150 is changed to rotate clockwise until the third switch 114a1 is triggered, making the motor 152 of the second driving assembly 150 stop operating (step S6053).

If the determination of the step S6032 is no, whether the first switch 112a and the third switch 114a1 are triggered is further determined (step S6044). If the determination of the step S6044 is yes, the motor 152 of the second driving assembly 150 is made to rotate counter-clockwise until the fourth switch 114a2 is triggered, making the motor 152 of the second driving assembly 150 stop operating (step S6054). After the step S6054, the motor 142 of the first driving assembly 140 is made to rotate counter-clockwise until the second switch 112b is triggered, making the motor 142 of the first driving assembly 140 stop operating (step S6062).

If the determination of the step S6044 is no, the motor 142 of the first driving assembly 140 is made to rotate clockwise until the first switch 112a is triggered, making the motor 142 of the first driving assembly 140 stop operating (step S6055). After the step S6055, the motor 152 of the second driving assembly 150 is made to rotate clockwise until the third switch 114a1 is triggered, making the motor 152 of the second driving assembly 150 stop operating (step S6063).

Figure 9:
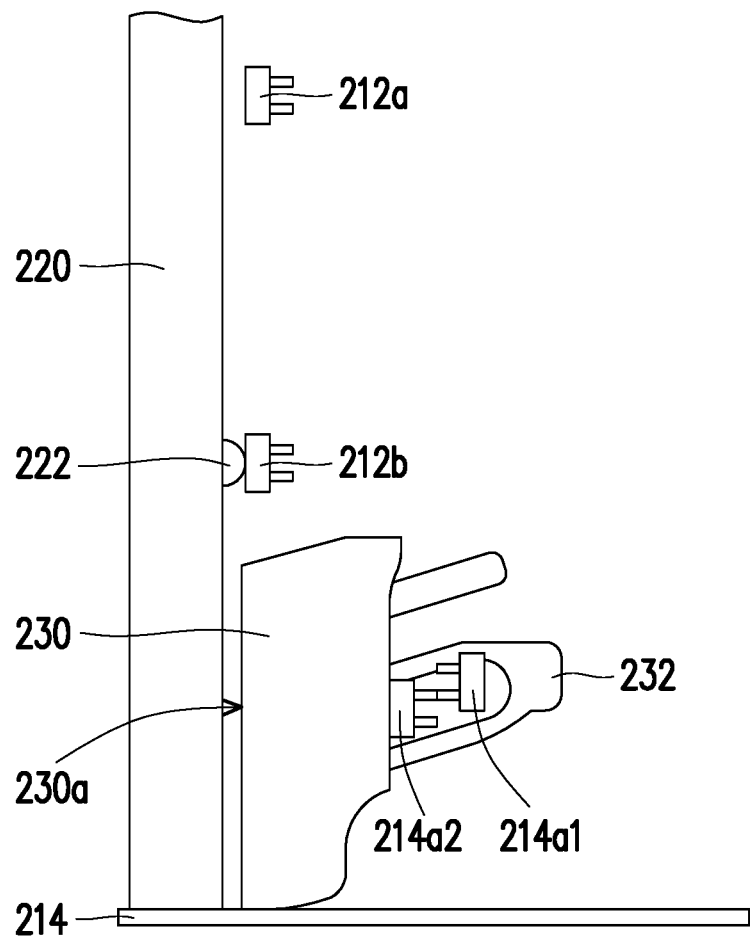
FIG. 9 and FIG. 10 are schematic views of the action of the display and the functional assembly according to another embodiment of the disclosure.
Figure 10:
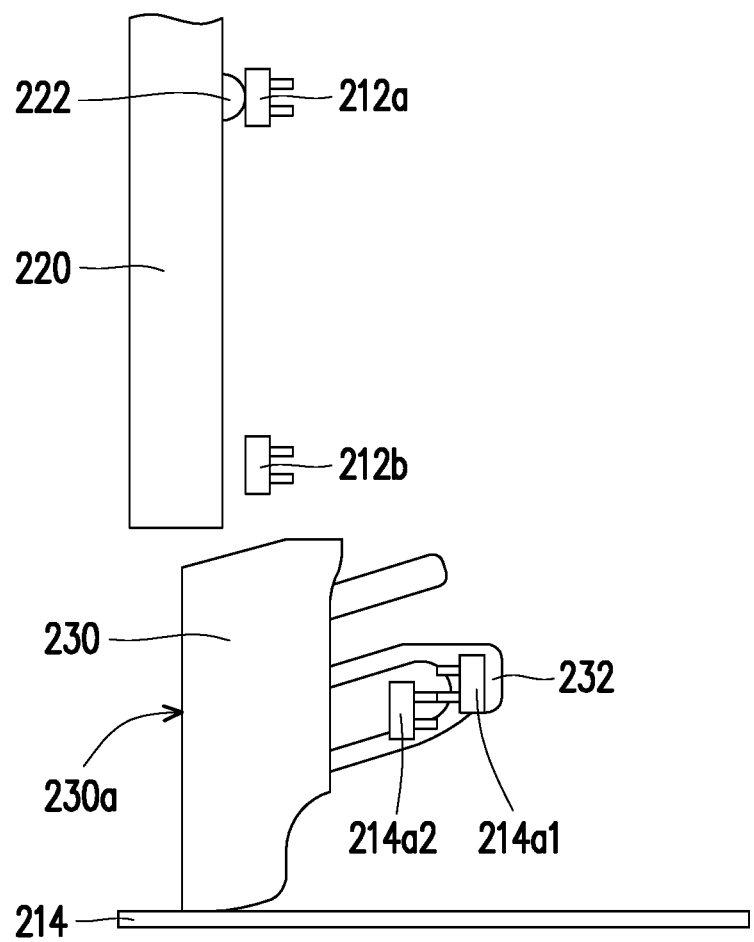

FIG. 9 and FIG. 10 are schematic views of the action of the display and the functional assembly according to another embodiment of the disclosure. In the embodiments of FIG. 9 and FIG. 10, the disposal and the mode of action of the first switch 212a, the second switch 212b, the supporting base 214, the third switch 214a1, the fourth switch 214a2, the display 220, the first triggering portion 222, the functional assembly 230, the functional interface 230a, the second triggering portion 232, and the second driving assembly (not drawn) is similar to the disposal and mode of action of the first switch 112a, the second switch 112b, the supporting base 114, the third switch 114a1, the fourth switch 114a2, the display 120, the first triggering portion 122, the functional assembly 130, the functional interface 130a, the second triggering portion 132, and the second driving assembly 150 of FIG. 6 and FIG. 7, and therefore would not be described again.

The differences between the embodiments as shown in FIG. 9 and FIG. 10 and the embodiments as shown in FIG. 6 and FIG. 7 are that the second driving assembly is adapted to drive the functional assembly 230 to move horizontally between the first state as shown in FIG. 9 and the second state as shown in FIG. 10, rather than driving the functional assembly 230 to rotate. The second driving portion 232 is used to trigger the third switch 214a1 under the state as shown in FIG. 10, and the fourth switch 214a2 is triggered by the main body of the functional assembly 230 under the state as shown in FIG. 9. In addition, when the functional assembly 230 is in the first state as shown in FIG. 9, the functional interface 230a is not located on the moving path of the display 220; and when the functional assembly 230 is in the second state as shown in FIG. 10, the functional interface 230a is located on the moving path of the display 220 to be closer to the user. In other embodiments, the functional assembly may further act between the first state and the second state through other ways of action and is not limited by the disclosure.

Figure 11A:
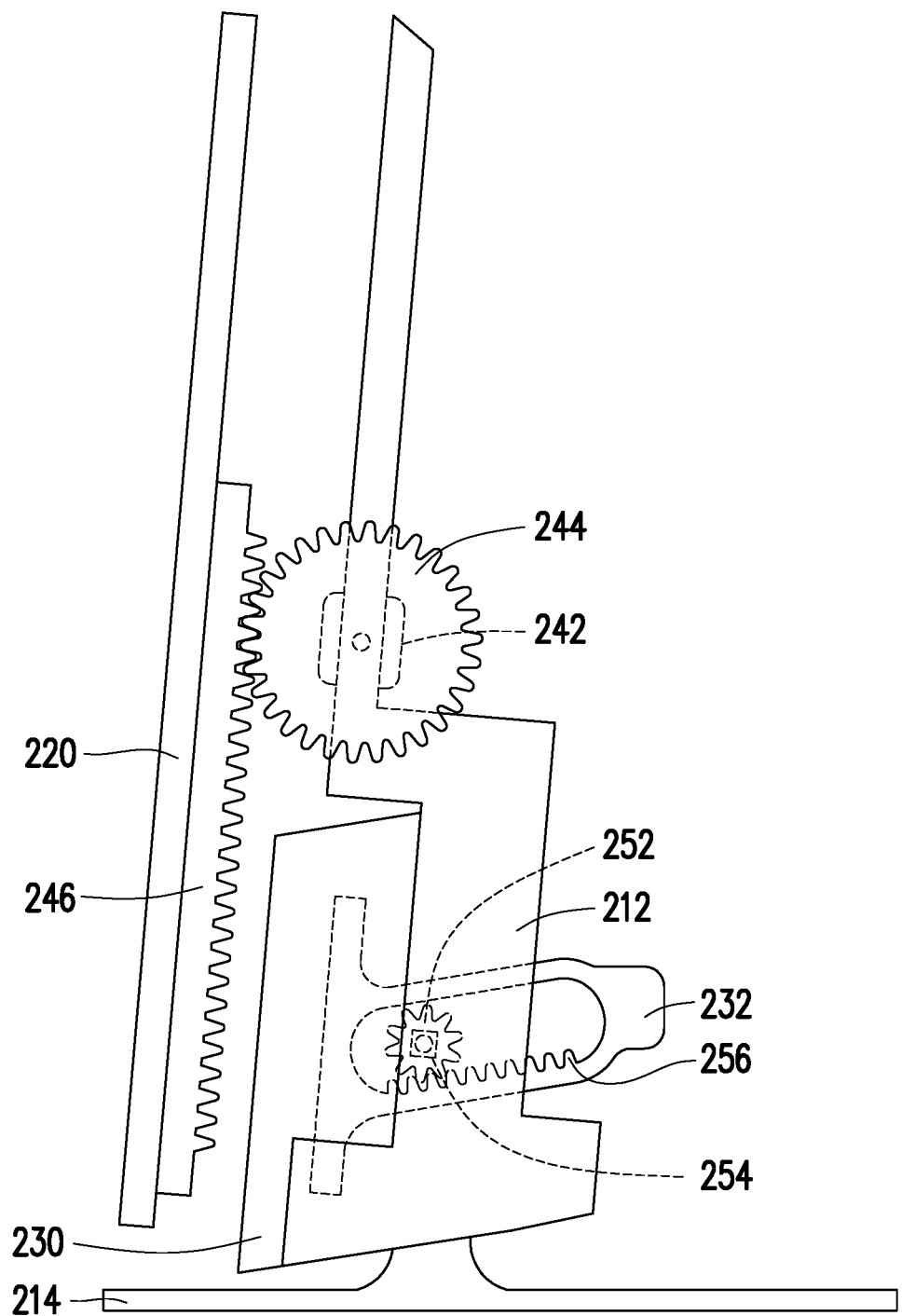
FIG. 11A to FIG. 11C show the specific driving ways of the display and the functional assembly of FIG. 9 and FIG. 10.
Figure 11B:
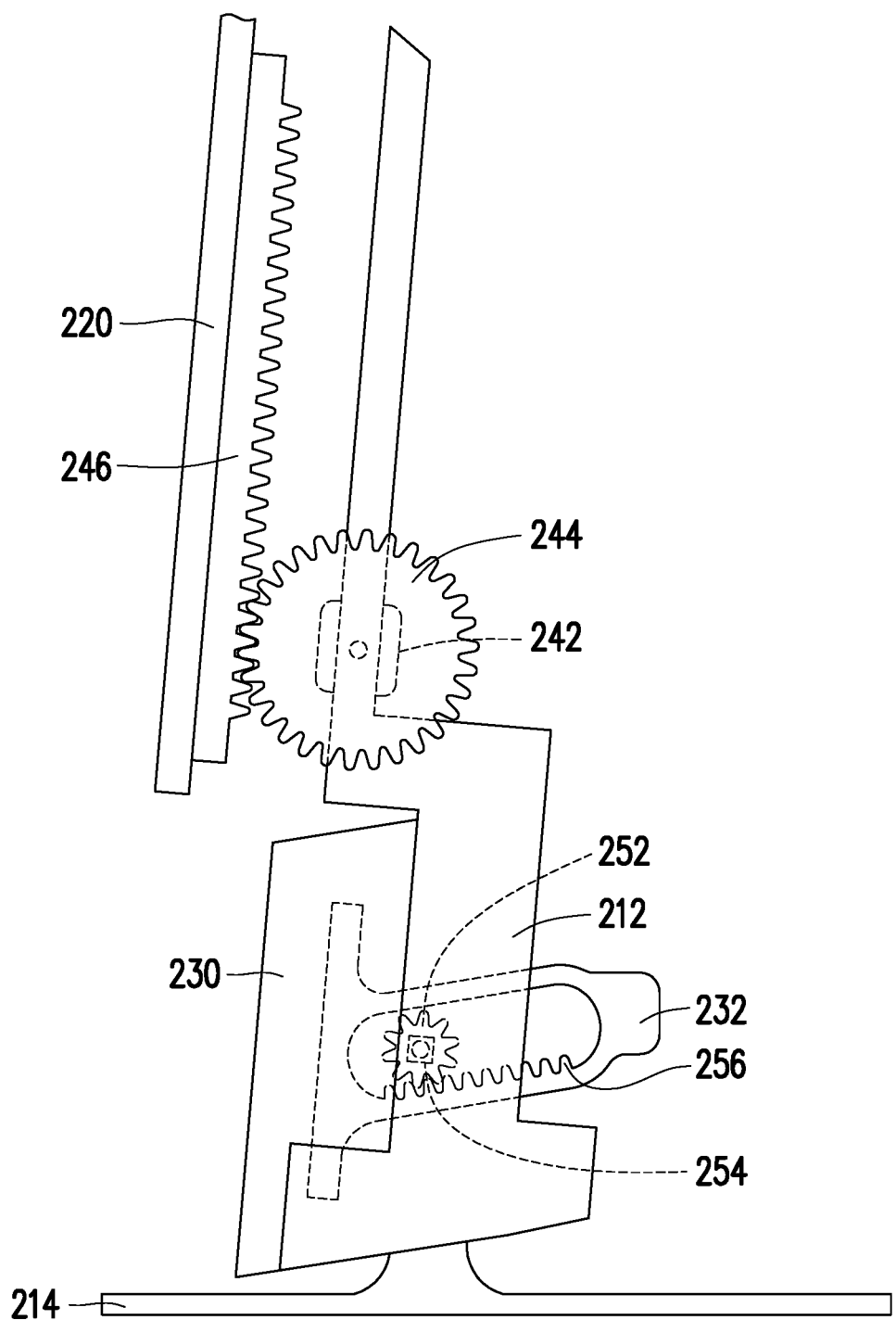
Figure 11C:
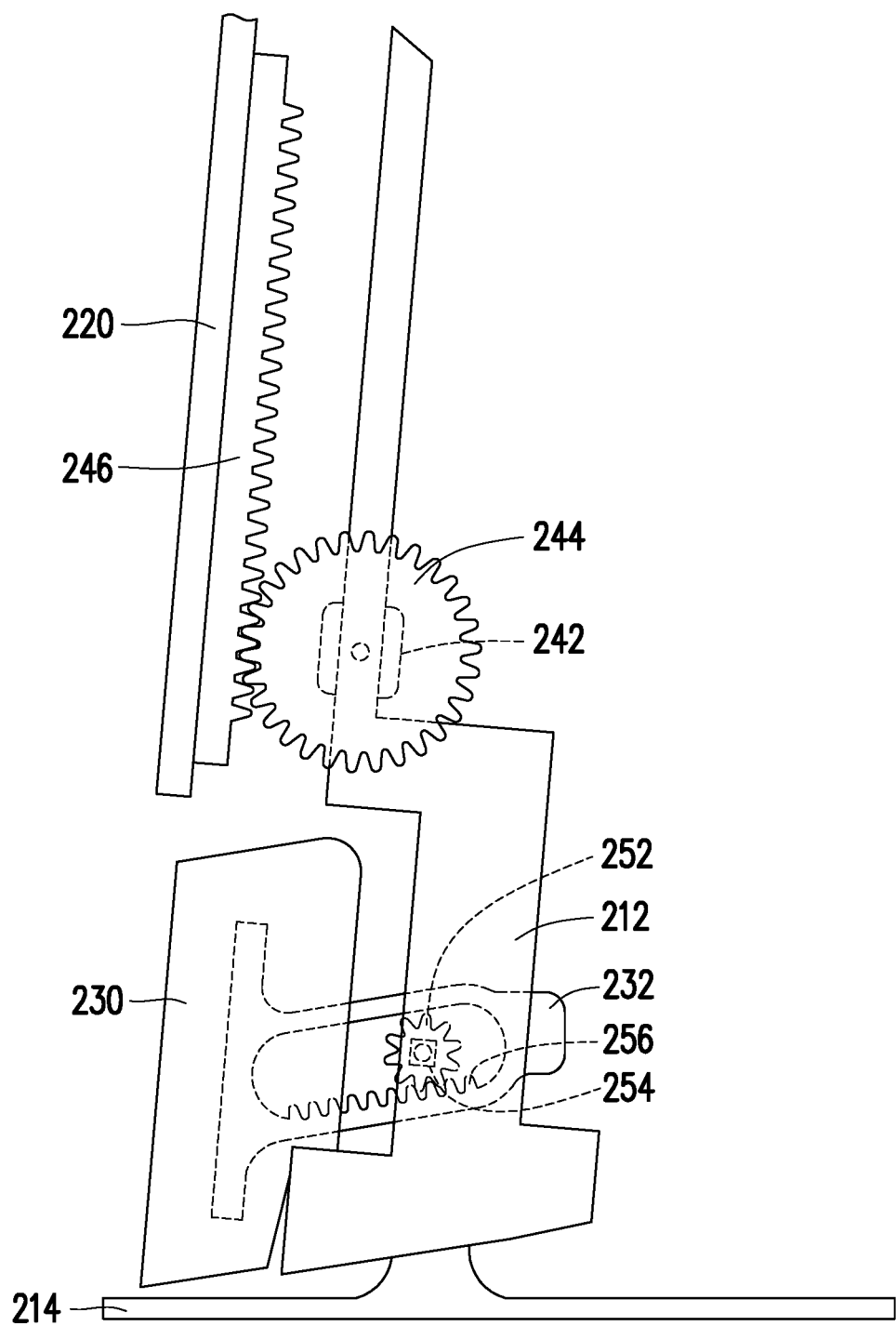

FIG. 11A to FIG. 11C show the specific driving ways of the display and the functional assembly of FIG. 9 and FIG. 10. Specifically, the motor 242 disposed on the host 212 as shown in FIG. 11A may drive the gear 244 connected to the motor 242 to rotate to drive the rack 246 disposed on the display 220 and engaging the gear 224 to elevate, making the display 220 elevate to the state as shown in FIG. 11B from the state as shown in FIG. 11A. At the moment, the first triggering portion 222 (as shown in FIG. 10) of the display 220 triggers the first switch 212a (as shown in FIG. 10) of the host 214, driving the motor 242 to stop acting, and driving the motor 252 disposed on the host 212 to drive the gear 254 connected to the motor 252 to rotate to drive the rack 256 disposed on the functional assembly 230 and engaging the gear 254 to move, making the functional assembly 230 forward to the state as shown in FIG. 11C from the state as shown in FIG. 11B. At the moment, the second triggering portion 232 (as shown in FIG. 10) moving along with the functional assembly 230 triggers the third switch 214a1 of the host 214 to drive the motor 252 to stop acting.

On the contrary, the motor 252 disposed on the host 212 may drive the gear 254 connected to the motor 252 to rotate to drive the rack 256 disposed on the functional assembly 230 and engaging the gear 254 to move, making the functional assembly 230 to reverse to the state as shown in FIG. 11B from the state as shown in FIG. 11C. At the moment, the second triggering portion 232 (as shown in FIG. 9) moving along with the functional assembly 230 triggers the fourth switch 214a2 (as shown in FIG. 9) of the host 214, driving the motor 252 to stop acting, and driving the motor 242 disposed on the host 212 to drive the gear 244 connected to the motor 242 to rotate to rotate to drive the display rack 246 disposed on the display 220 and engaging the gear 244 to move, making the display 220 to descend to the state as shown in FIG. 11A from the state as shown in FIG. 11B. At the moment, the first triggering portion 222 (as shown in FIG. 9) disposed on the display 220 triggers the second switch 212b of the host 214, driving the motor 242 to stop acting.

Based on the above, in the electronic device of the disclosure, when the display act to the upper position, the functional assembly may correspondingly act to the second state from the first state. In addition, when the functional assembly restores to the first state, the display may correspondingly restore to the lower position. In other words, the display and the functional assembly may act in sequence automatically to allow the user to have a good operating experience.

Although the disclosure has been disclosed in the above embodiments, the embodiments are not intended to limit the disclosure, and those skilled in the art may make some modifications and refinements without departing from the spirit and scope of the disclosure. Therefore, the scope of the disclosure is defined by the claims attached below.

What is claimed is:

1. An electronic device comprising:
   a base;
   a display movably connected to the base and adapted to move between a lower position and an upper position relative to the base; and
   a functional assembly movably connected to the base and adapted to move between a first state and a second state relative to the base,
   wherein when the display moves to the upper position from the lower position, the functional assembly moves to the second state from the first state, and when the functional assembly moves to the first state from the second state, the display moves to the lower position from the upper position,
   wherein when the display is located at the lower position, the display conceals the functional assembly, and when the display moves to the upper position, the display exposes the functional assembly.

2. The electronic device according to claim 1, comprising a first driving assembly, wherein when the first driving assembly is connected between the base and the display, and adapted to drive the display to move between the lower position and the upper position.

3. The electronic device according to claim 2, wherein the first driving assembly comprises:
   a motor disposed on the base;
   a gear connected to the motor; and
   a rack disposed on the display and engaging the gear, wherein the motor drives the gear to rotate along the rack, so as to drive the display to elevate.

4. The electronic device according to claim 1, comprising a second driving assembly, wherein the second driving assembly is connected between the base and the functional assembly, and adapted to drive the functional assembly to move between the first state and the second state.

5. The electronic device according to claim 4, wherein the second driving assembly comprises:
   a motor disposed on the base;
   a gear connected to the motor; and
   at least another gear disposed on the functional assembly and engaging the gear, wherein the motor drives the gear to rotate, and the gear drives the another gear such that the functional assembly rotates.

6. The electronic device according to claim 4, wherein the second driving assembly is adapted to drive the functional assembly to rotate.

7. The electronic device according to claim 4, wherein the second driving assembly is adapted to drive the functional assembly to move horizontally.

8. The electronic device according to claim 1, wherein the display has a display surface, and the functional assembly has a functional interface, when the functional assembly is in the first state, the functional interface and the display surface respectively face opposite directions, and when the function assembly is in the second state, the functional interface and the display surface face the same direction.

9. The electronic device according to claim 1, wherein the functional assembly has a functional interface, when the functional assembly is in the first state, the functional interface is not located on the moving path of the display, and when the functional assembly is in the second state, the functional interface is located on the moving path of the display.

10. The electronic device according to claim 1, wherein the base has a first switch and a second switch, and the display has a first triggering portion,
when the display moves to the upper position from the lower position, the first triggering portion triggers the first switch such that the display stops moving and the functional assembly moves to the second state from the first state,
when the display moves to the lower position from the upper position, the first triggering portion triggers the second switch such that the display stops moving.

11. The electronic device according to claim 1, wherein the base has a third switch and a fourth switch, and the functional assembly has a second triggering portion,
when the functional assembly moves to the second state from the first state, the second triggering portion triggers the third switch such that the functional assembly stops moving,
when the functional assembly moves to the first state from the second state, the second triggering portion triggers the fourth switch such that the functional assembly stops moving and the display moves to the lower position from the upper position.

12. The electronic device according to claim 1, wherein the base comprises a host and a supporting base, the host is disposed on the supporting base, the display is movably connected to the host, and the functional assembly is movably connected to the supporting base.

13. The electronic device according to claim 1, wherein the functional assembly comprises at least one speaker.

14. An electronic device comprising:
a base;
a display movably connected to the base and adapted to move between a lower position and an upper position relative to the base; and
a functional assembly movably connected to the base and adapted to move between a first state and a second state relative to the base,
wherein when the display moves to the upper position from the lower position, the functional assembly moves to the second state from the first state, and when the functional assembly moves to the first state from the second state, the display moves to the lower position from the upper position,
wherein the display has a display surface, and the functional assembly has a functional interface, when the functional assembly is in the first state, the functional interface and the display surface respectively face opposite directions, and when the function assembly is in the second state, the functional interface and the display surface face the same direction.

15. An electronic device comprising:
a base;
a display movably connected to the base and adapted to move between a lower position and an upper position relative to the base; and
a functional assembly movably connected to the base and adapted to move between a first state and a second state relative to the base,
wherein when the display moves to the upper position from the lower position, the functional assembly moves to the second state from the first state, and when the functional assembly moves to the first state from the second state, the display moves to the lower position from the upper position,
wherein the functional assembly has a functional interface, when the functional assembly is in the first state, the functional interface is not located on the moving path of the display, and when the functional assembly is in the second state, the functional interface is located on the moving path of the display.

16. An electronic device comprising:
a base;
a display movably connected to the base and adapted to move between a lower position and an upper position relative to the base; and
a functional assembly movably connected to the base and adapted to move between a first state and a second state relative to the base,
wherein when the display moves to the upper position from the lower position, the functional assembly moves to the second state from the first state, and when the functional assembly moves to the first state from the second state, the display moves to the lower position from the upper position,
wherein the base has a first switch and a second switch, and the display has a first triggering portion,
when the display moves to the upper position from the lower position, the first triggering portion triggers the first switch such that the display stops moving and the functional assembly move to the second state from the first state,
when the display moves to the lower position from the upper position, the first triggering portion triggers the second switch such that the display stops moving.

17. An electronic device comprising:
a base;
a display movably connected to the base and adapted to move between a lower position and an upper position relative to the base; and
a functional assembly movably connected to the base and adapted to move between a first state and a second state relative to the base,
wherein when the display moves to the upper position from the lower position, the functional assembly moves to the second state from the first state, and when the functional assembly moves to the first state from the second state, the display moves to the lower position from the upper position,
wherein the base has a third switch and a fourth switch, and the functional assembly has a second triggering portion,
when the functional assembly moves to the second state from the first state, the second triggering portion triggers the third switch such that the functional assembly stops moving, when the functional assembly moves to the first state from the second state, the second triggering portion triggers the fourth switch such that the functional assembly stops moving and the display moves to the lower position from the upper position.

* * * * *